(12) United States Patent
Beyer et al.

(10) Patent No.: US 8,590,965 B2
(45) Date of Patent: Nov. 26, 2013

(54) FOLDING TABLE FOR A VEHICLE

(75) Inventors: Kurt Beyer, Wiesbaden (DE); Holger Weyer, Wiesbaden-Bierstadt (DE); Jong Hyuk Park, Bad Soden (DE); Gregory Hill-Young, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 372 days.

(21) Appl. No.: 12/888,349

(22) Filed: Sep. 22, 2010

(65) Prior Publication Data

US 2011/0121617 A1  May 26, 2011

(30) Foreign Application Priority Data

Sep. 24, 2009  (DE) .......................... 10 2009 042 879

(51) Int. Cl.
*A47C 7/62* (2006.01)
*A47B 83/02* (2006.01)

(52) U.S. Cl.
USPC ................... 297/188.06; 297/188.2; 297/146; 297/163

(58) Field of Classification Search
USPC ........................ 297/188.06, 188.2, 146, 163
See application file for complete search history.

(56) References Cited

U.S. PATENT DOCUMENTS

| | | | |
|---|---|---|---|
| 6,279,992 B1 | 8/2001 | Plocher et al. | |
| 6,409,137 B1* | 6/2002 | Tran | 248/311.2 |
| 6,484,989 B1* | 11/2002 | Connery | 248/311.2 |
| 7,104,599 B2* | 9/2006 | Berger et al. | 297/163 |
| 7,281,762 B1* | 10/2007 | Getfield et al. | 297/173 |
| 7,540,560 B1* | 6/2009 | Connery | 297/149 |
| 2006/0214479 A1* | 9/2006 | Dwire et al. | 297/163 |
| 2008/0238169 A1* | 10/2008 | Hicks et al. | 297/353 |

FOREIGN PATENT DOCUMENTS

| | | |
|---|---|---|
| AU | 725306 B2 | 10/2000 |
| DE | 4343242 A1 | 6/1995 |
| DE | 19848889 A1 | 4/1999 |
| DE | 19833888 C1 | 1/2000 |
| DE | 10057450 A1 | 5/2002 |
| DE | 20315554 U1 | 12/2003 |
| DE | 102008010032 A1 | 10/2008 |
| FR | 2656841 A1 | 7/1991 |
| FR | 2908702 A1 | 5/2008 |
| GB | 2239639 A | 7/1991 |
| WO | 2004014198 A2 | 2/2004 |

OTHER PUBLICATIONS

German Patent Office, German Search Report for German Application No. 102009042879.8, Oct. 4, 2010.
British Patent Office, British Search Report for British Application No. 1017269.0, Jan. 12, 2011.

* cited by examiner

*Primary Examiner* — Sarah B McPartlin
(74) *Attorney, Agent, or Firm* — Ingrassia Fisher & Lorenz, P.C.

(57) ABSTRACT

A folding table is provided for a vehicle. The folding table includes, but is not limited to a tabletop that can be fastened to a vehicle seat so that it can be pivoted from a pivoted-in non-usage position into a pivoted-out usage position. At substantially the same time, at least one connection point is provided at which accessory parts can be detachably fastened.

12 Claims, 4 Drawing Sheets

FOLDING TABLE FOR A VEHICLE

CROSS-REFERENCE TO RELATED APPLICATION

This application claims priority to German Patent Application No. 102009042879.8, filed Sep. 24, 2009, which is incorporated herein by reference in its entirety.

TECHNICAL FIELD

The invention relates to a folding table for a vehicle.

BACKGROUND

In a vehicle such as, for example, in a passenger automobile, a bus, a train, or an airplane, it is frequently desirable to attach a table in the passenger compartment. Various items such as, for example, toys, cellular telephones, food, drink, or similar can be placed and stowed on this table for passengers. In this case, it is important that the placed items are held securely so that they do not fall to the floor, i.e. into the foot well of the vehicle, when the vehicle brakes sharply or goes around a curve.

For this purpose, it is known for example, to fasten a folding table to a seat. The folding table can be folded or pivoted into a usage position during use in order to provide persons located behind the seat with a depositing surface. However, the scope for positioning various items securely from falling down is severely limited with this type of folding table.

Further known from WO 2004/014198 is a tray that can be attached via a flange in a gap of the side window. Inter alia, the table has a tabletop and a drinks holder in order to securely stow, for example, drinks cans or cups. A disadvantage with such a tray is its very large external dimensions, which severely restrict the freedom of movement of the passengers during use and also the lack of flexibility to be able to respond to the requirements of the passengers.

It is at least one object of the present invention to provide a folding table for a vehicle which is compact in its dimensions and flexible in its use. In addition, other objects, desirable features and characteristics will become apparent from the subsequent summary and detailed description, and the appended claims, taken in conjunction with the accompanying drawings and this background.

SUMMARY

According to an embodiment of the invention, a folding table is provided for a vehicle, comprising a tabletop, which can be fastened to a vehicle seat so that it can be pivoted from a pivoted-in non-usage position into a pivoted-out usage position, wherein at least one connection point is provided at which accessory parts can be detachably fastened.

Due to the pivotability, it is possible for the folding table to be pivoted into a non-usage position when it is not required. It therefore requires only very little space and does not disturb the travelers in their freedom of movement. However, if possibilities for placement are desired, the folding table can be pivoted into a usage position. In the usage position, the tabletop of the folding table is in a substantially horizontal alignment so that the table top forms a placement area for various items on its upper side. If this placement area is not sufficient or items need to be transported or fixed particularly securely such as, for example, drinks cans, cellular telephones, computers, or similar, additional accessory parts such as special holders can be fastened detachably to the connection points of the folding table. The connection point is in particular configured as a fastening means for the detachable fastening of the accessory part. By this means the accessory part can be positively connected, for example, by means of a snap connection and/or a hook connection to the fastening point. Additionally or alternatively, the accessory parts can be connected to the connection point via a dovetail connection and/or a bayonet closure. Preferably at least two accessory parts have a substantially identically formed connecting means to be able to connect accessory parts to the same connection point and exchange them if necessary. Accordingly, the tabletop can have at least two substantially identically formed connection points.

The accessory parts can easily be removed from the folding table if they are not required. Furthermore, in each case precisely the type of accessory parts, which specifically correspond to the requirements of the traveler or travelers, can be attached to the folding table. Therefore, precisely only the accessory parts corresponding to the requirements of the traveler or travelers can always be fastened to the folding table. As a result, the folding table according to an embodiment of the invention ensures a high degree of flexibility. Furthermore, the traveler is always afforded a high degree of comfort since the dimensions of the folding table are only enlarged to the extent absolutely necessary, the folding table can therefore be kept extremely compact.

It is particularly advantageous in this case if at least one connection point is disposed on a peripheral side of the tabletop. The peripheral side connects a substantially upwardly pointing upper side of the tabletop in the folded-out state with a substantially downwardly pointing underside of the tabletop in the folded-out state. Due to the positioning of the connection point on the peripheral side, the size of the depositing surface formed by the tabletop is not reduced since the accessory parts can be located laterally of the tabletop and in particular can project laterally from the tabletop. Furthermore, the accessory parts can be arranged ergonomically favorably so that the placement or gripping of items is very convenient.

In a further advantageous embodiment, at least one connection point is disposed on the underside of the tabletop. As a result, the accessory parts can also be used when the tabletop is pivoted into a non-usage position. By this means, the traveler has particular flexibility since in this case he/she only needs to accept the very restricted space requirement of the accessory part. The traveler's freedom of movement is scarcely restricted thereby.

It is furthermore advantageous if the at least one connection point is configured to form a positive connection with the accessory part. A particularly simple connection can thus be made. At the same time, it is particularly advantageous if the at least one connection point is formed by two undercuts, wherein the undercuts are configured to form a snap connection with projections of an accessory part. It is thus possible to make the accessory parts snap on the folding table with a hand movement, which constitutes a particularly simple and convenient connection.

A vehicle seat is also provided that comprises a seat surface, a backrest, and a folding table fastened to a backrest, which can be configured and further developed as described hereinbefore. There is preferably provided a storage compartment in which various accessory parts can be positioned, wherein the accessory parts can be detachably fastened to the folding table. The storage compartment is in particular formed, at least in part, by plastic injection molding in the backrest of the vehicle seat and can preferably be closed by an, in particular, pivotable, flap. The accessory parts can thereby be stored readily accessibly for the vehicle occupants when the respective accessory part is not intended to be in use.

A motor vehicle is also provided that comprises a vehicle seat which can be configured and further developed as described hereinbefore.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
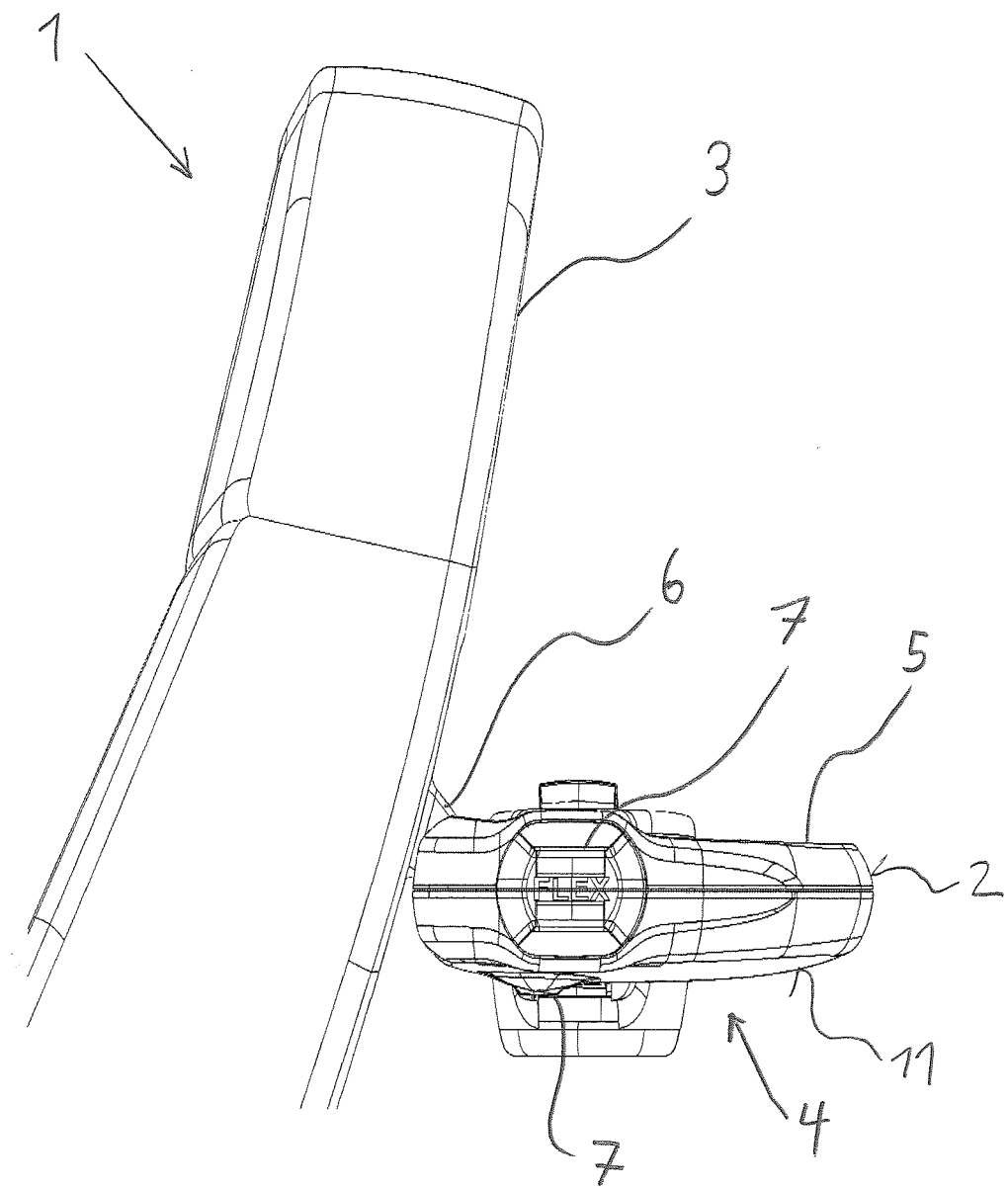
FIG. 1 shows a schematic side view of a vehicle seat with a folding table.

FIG. 1 shows a vehicle seat 1 comprising a seating surface and a backrest 3. The vehicle seat 1 can preferably be a front seat of a motor vehicle or also a seat on a bus, airplane, or a train. A folding table 4 with a tabletop 5 can be fastened to the rearward side of the backrest 3 of the vehicle seat 1. At the same time, it is possible to fasten the folding table 4 detachably to the vehicle seat 1. As a result, the entire folding table 4 can be removed from the vehicle seat 1.

According to FIG. 1, the folding table 4 is pivotably articulated to at least one articulation point 6. As a result, the tabletop 5 of the folding table 4 can be pivoted into a non-usage position in which the tabletop 5 abuts against the rearward side of the backrest 3. In its non-usage position, the tabletop 5 of the folding table 4 is preferably pivoted upward and can be fixed in this position by means of at least one fastening means. A pivoting upward is preferred which is why reference is made hereinafter to this type of pivoting. Alternatively, however, it is also possible to pivot the tabletop 5 downward into a non-usage position. In its non-usage position, the tabletop 5 requires no space and does not impair the freedom of movement or leg space of the passengers.

If the traveler wishes to use the folding table 4, the tabletop 5 can be pivoted out from its non-usage position into a usage position. This position is shown in FIG. 1. In its usage position, the tabletop 5 is located in a substantially horizontal alignment. In this case, it is particularly preferable if the folding table 4 is articulated to the vehicle seat 1 in such a manner that it retains its horizontal alignment regardless of the inclination of the backrest 3.

When the folding table 4 is located in its usage position, the tabletop 5 provides a placement area for items. This placement area is thus formed by the upper side of the tabletop 5. The placement area can be substantially flat. In this way a uniform surface is provided, which is frequently desirable. It is further possible to provide various profilings such as, for example, a cup recess or a recess for pens or similar. Furthermore, the folding table can preferably also have a border at its upper-side circumference. This prevents items from being able to fall from the table. This effect can be further intensified by providing the placement area with an anti-slip coating such as, for example, rubber or similar.

The storage space provided on the folding table 4 is frequently not sufficient or various items such as drinks cans or drinks bottles should be positioned and fixed particularly securely. For this purpose it is provided that the folding table 4 has connection points 7 on its peripheral side 2, to which accessory parts 8 can be detachably fastened.

The connection points 7 are preferably arranged on the peripheral side of the tabletop 5 of the folding table 4. This arrangement can be arbitrarily selected but it is particularly advantageous if the connection points 7 are arranged laterally, as shown in FIG. 1, and/or on the peripheral side directed toward the traveler. In this way, the accessory parts 8 can be fastened particularly ergonomically.

Additionally or alternatively to the arrangement on the peripheral side of the tabletop 5, connection points 7 can also be provided on the underside of the tabletop 5. It is thereby possible to also use these connection points 7 and fasten accessory parts 8 there when the tabletop 5 is pivoted into a non-usage position. If the tabletop 5 can be pivoted downward into a non-usage position by pivoting, it is expedient to provide the connection points 7 on the upper side of the tabletop 5.

Figure 2:
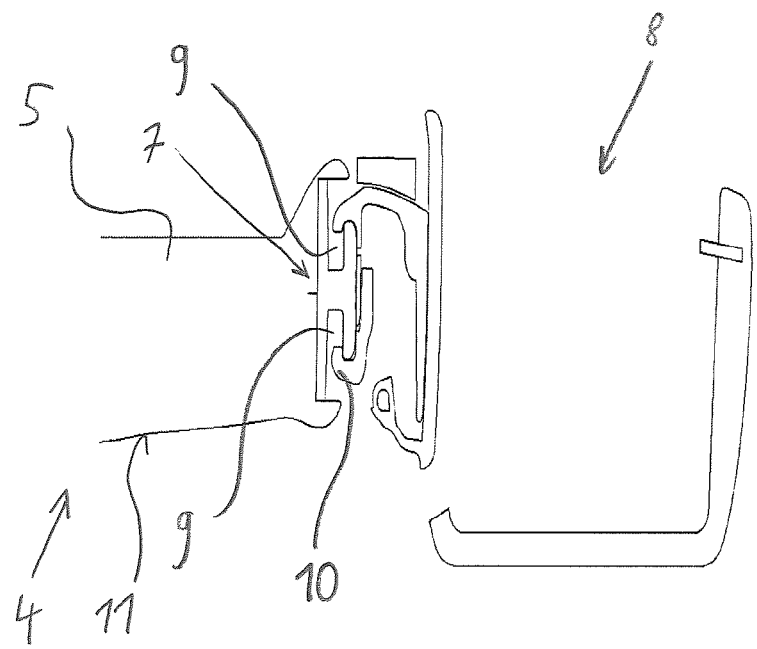
FIG. 2 shows a side view of an accessory part for a folding table.

The connection points 7 are preferably configured to form a positive connection with an accessory part 8. As a result, no expensive connection mechanisms are required. On the contrary the connection can thus be made securely in a simple manner. For this purpose, it can be provided that the connection points 7 on the tabletop 5 are formed by two undercuts 9, as shown in FIG. 2. Such connection points 7 are advantageous since they are simple to produce and therefore cost-effective. Furthermore, they do not enlarge the external dimensions of the tabletop 5 so that the folding table 4 can be kept very compact.

Figure 4:
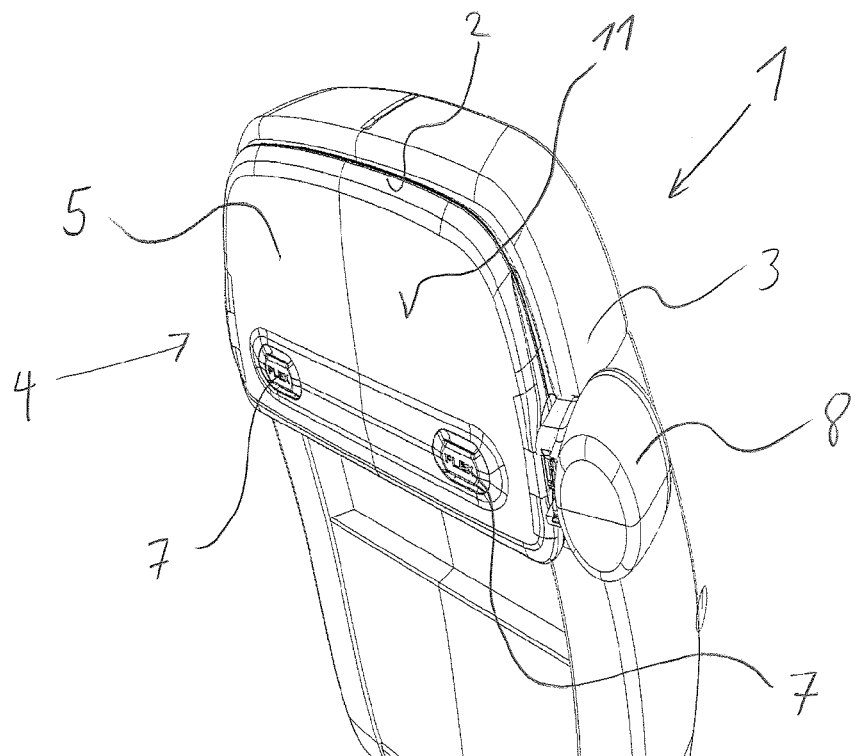
FIG. 4 shows a perspective view of the folding table from FIG. 3 in a non-usage position.

In particular, the undercuts 9 are configured in such a manner that they are configured to form a snap connection with projections 10 of an accessory part 8. An accessory part 8 having such projections is shown in FIG. 4. In order that the undercuts 9 are configured to form a snap connection with the projections 10, the undercuts 9 should be adapted to the dimension of the projections 10. Alternatively, the projections 10 can also be adapted to the undercuts 9. In this case, it is taken into account that the projections 10 and the undercuts 9 are dimensioned and formed in such a manner that the projections 10 can engage precisely behind the undercuts 9. By this means the undercuts 9 and the projections 10 form a positive snap connection.

According to FIG. 2, the accessory part 8 has two projections 10, which are configured to be arcuate and can engage behind the undercuts 9 of the tabletop 5. As a result, the accessory part 8 can be easily snapped onto the tabletop 5, forming the positive snap connection. In this way, the accessory part can be fastened particularly easily on the tabletop 5 and detached from this.

Figure 3:
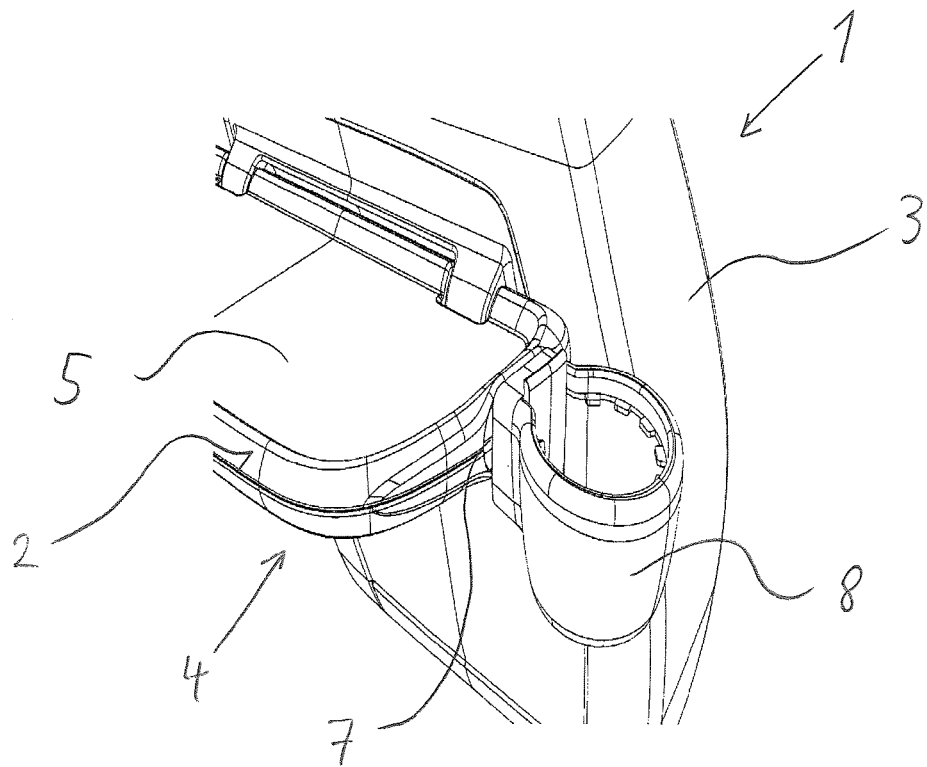
FIG. 3 shows a perspective view obliquely from the front of a folding table with an accessory part.

Preferred accessory parts can, for example, be fastening tapes, nets, drinks holders, holders for cellular telephones etc. Consequently, different accessory parts can be fastened to a connection point 7. It is also possible to fasten different accessory parts to different connection points 7. A high degree of flexibility is thereby ensured. For example, FIG. 3 shows a folding table 4, on which a drinks holder is fastened as an accessory part 8.

Furthermore, it is however also possible to form a desk from the folding table, by fastening a board preferably on the surface of the tabletop, on the surface whereof a holder can be provided for a laptop, a netbook, pens, or similar. The board can then be fastened, for example, to two different connection points. Equally, entertainment possibilities can be provided by fastening a special surface with holders for a mobile DVD player, MP3 player, or similar.

In this way, utensils for eating, games, and similar can be secured, there being almost no restriction on the resulting possibilities. Consequently, as described above, a workplace, an entertainment place, a games area, or even an eating place can be created from the passenger compartment. With the folding table 4, it is possible to react so very flexibly to the requirements of the travelers.

The folding table 4 at the same time affords the highest possible degree of compactness. This is because in the opposite case in which it is specifically not desired to accommodate additional items, the accessory parts 8 can easily be removed from the folding table 4. Consequently, only precisely the accessory parts 8 that the user actually requires need be fastened to the folding table 4. The degree of freedom is thereby only reduced by as much as is necessary, which leads to great comfort.

Furthermore, the vehicle seat 1, on which the folding table 4 can be fastened, can for example have a storage compartment positioned underneath the folding table 4 in which the various accessory parts 8 can be stored or positioned. In this case, it is preferable if fastening devices are provided in the storage compartment to fix the accessory parts. The fastening devices are in particular adapted to the respective contour of the accessory part 8 to allow an intuitively optimal positioning of the accessory parts 8 in the storage compartment. As a result, the various accessory parts 8 are always on board and the passenger can respond to his needs at all times. To this end, he can then only remove the appropriate accessory part or accessory parts from the storage compartment and fasten them to the folding table 4.

Figure 5:
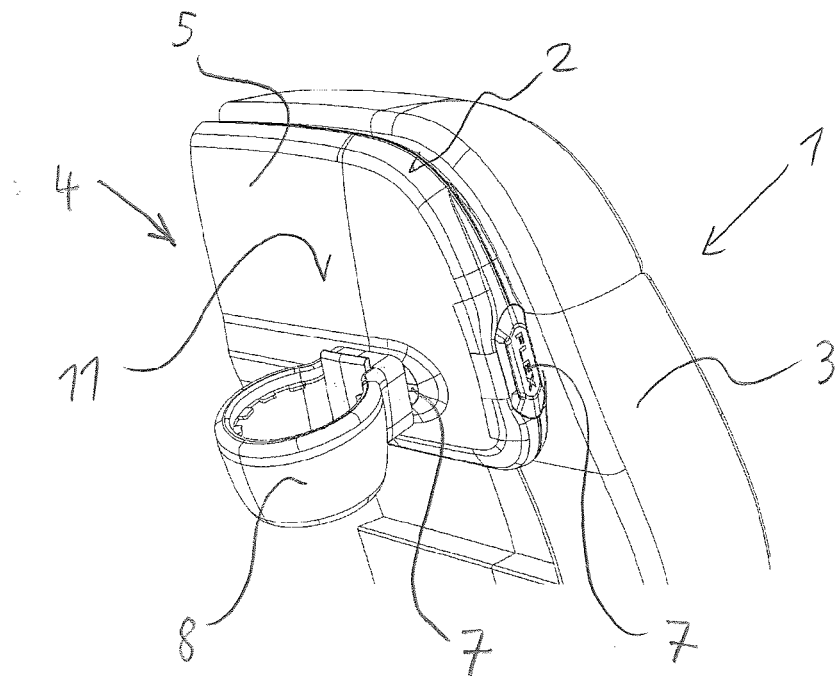
FIG. 5 shows a perspective view of the folding table from FIG. 3 in a further usage position.

In the non-usage position of the folding table 4 shown in FIG. 4, the accessory part 8 configured as a drinks holder can stay connected to the tabletop 5 of the folding table 4 on the peripheral side 2. A collision of the accessory part 8 with the backrest 3 is avoided by a suitable positioning and dimensioning of the accessory part 8. Furthermore, in the non-usage position of the folding table 4, the accessory part 8 can be shifted from the peripheral side 2 of the tabletop 5 to a rear side 11 of the tabletop 5, as shown in FIG. 5. Since substantially identically formed fastening positions 7 are provided on the rear side 11 of the tabletop 5, the accessory part 8 configured as a drinks holder can be fastened in correct alignment both in the usage position and in the non-usage position of the folding table 4. The accessory parts 8 can thereby be flexibly adapted to the use of the folding table 4. In particular, the fastening points should be arranged symmetrically to a central line of the tabletop 5 running in the direction of travel so that the positioning of the accessory parts 8 can be adapted ergonomically both for right-handed persons and for left-handed persons.

Figure 6:
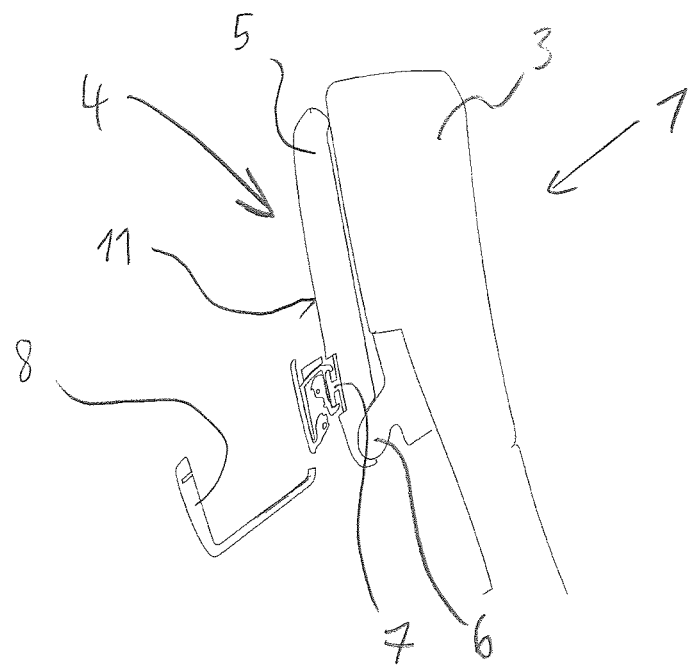
FIG. 6 shows a sectional view of the folding table from FIG. 5.
Figure 7:
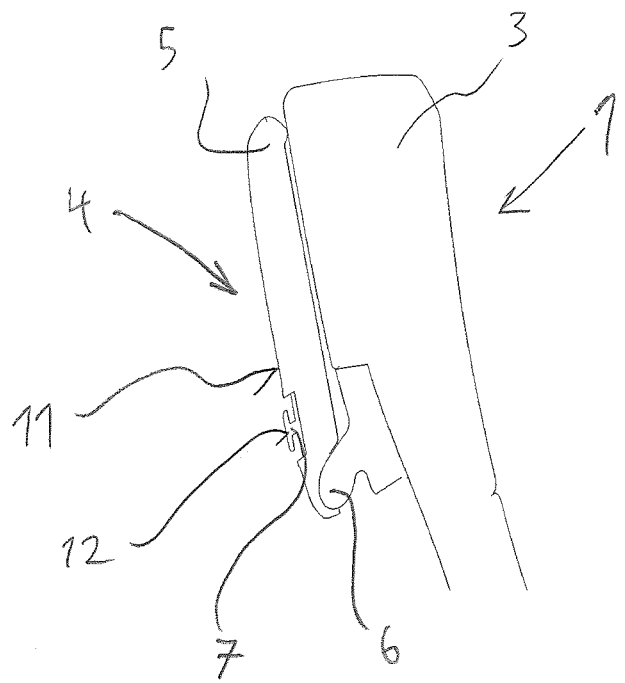
FIG. 7 shows a sectional view of the folding table from FIG. 6 with dismounted accessory part.

As can be identified in FIG. 6, the connection of the accessory part 8 to the tabletop 5 on the rear side 11 of the tabletop 5 is made similarly to the fastening of the accessory part 8 to the peripheral side of the tabletop 5 shown in FIG. 2. In the dismounted state of the accessory part 8, as shown in FIG. 7, accessory parts 8 projecting from the tabletop 5 are removed so that as much free space as possible remains in the passenger compartment. An outwardly pointing outer side 12 of the connection point 7 has substantially the same level as the rear side of the tabletop 5 and is preferably integrated in the form profile of the rear side 11 of the tabletop 5. Even when the accessory parts 8 are dismounted, this results in a visually pleasing design which is not perceived as a break in the selected use of forms but moves the additional usage possibilities of the folding table 4 in an accentuated manner into the consciousness of an observer. In particular, the fastening point is made of a metal material and is inserted or glued undetachably into a tabletop made of plastic or is injection-overmolded with the plastic material of the tabletop 5.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle seat, comprising:
a seat surface;
a backrest for the seat surface;
a folding table comprising a tabletop coupled to the backrest and adapted to pivot from a pivoted-in non-usage position into a pivoted-out usage position;
a first connection point disposed on a peripheral side of the tabletop and adapted to detachably fasten to an accessory part;
a second connection point disposed on an underside of the tabletop and adapted to detachably fasten the accessory part; and
a storage compartment adapted to receive the accessory part when not in use, wherein the accessory part is adapted to detachably fasten to the folding table.

2. The vehicle seat according to claim 1, wherein the connection points are each configured to form a positive connection with the accessory part.

3. The vehicle seat according to claim 2, wherein the connection points are each formed by at least two undercuts and the at least two undercuts are configured to form a snap connection with at least one projection of the accessory part.

4. The folding table according to claim 1, wherein the accessory part is further defined as a drink holder.

5. The folding table according to claim 1, further comprising a third connection point disposed within the storage compartment and adapted to detachably fasten the accessory part.

6. The folding table according to claim 1, wherein the connection points are each formed by at least two undercuts and the at least two undercuts are configured to form a snap connection with at least one projection of the accessory part.

7. A motor vehicle, comprising:
a vehicle body having an interior;
a vehicle seat within the interior of the vehicle body the vehicle seat comprising:
a seat surface;
a backrest for the seat surface;

a folding table comprising a tabletop that is adapted to fasten to the backrest and adapted to pivot from a pivoted-in non-usage position into a pivoted-out usage position;
a first connection point disposed on a peripheral side of the tabletop and adapted to detachably fasten to an accessory part; and
a second connection point disposed on an underside of the tabletop and adapted to detachably fasten the accessory part; and
a storage compartment adapted to receive the accessory part when not in use, wherein the accessory part is adapted to detachably fasten to the folding table.

8. The motor vehicle according to claim 7, wherein the connection points are each configured to form a positive connection with the accessory part.

9. The motor vehicle according to claim 7, wherein the connection points are each formed by at least two undercuts and the at least two undercuts are configured to form a snap connection with at least one projection of the accessory part.

10. The motor vehicle according to claim 7, further comprising a third connection point disposed within the storage compartment and adapted to detachably fasten the accessory part.

11. The motor vehicle according to claim 7, wherein the accessory part is further defined as a drink holder.

12. The motor vehicle according to claim 7, wherein the connection points are each formed by at least two undercuts and the at least two undercuts are configured to form a snap connection with at least one projection of the accessory part.

* * * * *